United States Patent [19]
Bleha et al.

[11] Patent Number: 6,017,123
[45] Date of Patent: Jan. 25, 2000

[54] PROJECTED IMAGE BLENDING FOR MULTIPLE IMAGES

[75] Inventors: William P. Bleha, Carlsbad; Stephen J. Reinsch, Vista, both of Calif.

[73] Assignee: Hughes-JVC Technology Corporation, Carlsbad, Calif.

[21] Appl. No.: 08/889,043

[22] Filed: Jul. 7, 1997

Related U.S. Application Data

[63] Continuation of application No. 08/593,561, Jan. 29, 1996, abandoned.

[51] Int. Cl.$^7$ .................................................. G03B 21/14
[52] U.S. Cl. ................................. 353/30; 353/94; 353/97
[58] Field of Search ............................... 353/30, 84, 94, 353/97, 122; 348/745, 806, 756, 779; 349/5, 7, 8; 359/888, 890

[56] References Cited

U.S. PATENT DOCUMENTS

| | | | |
|---|---|---|---|
| 4,505,558 | 3/1985 | Albers et al. | 353/30 |
| 4,974,073 | 11/1990 | Inova . | |
| 5,077,154 | 12/1991 | Corley | 353/30 |
| 5,136,390 | 8/1992 | Inova et al. . | |
| 5,437,946 | 8/1995 | McCoy . | |

FOREIGN PATENT DOCUMENTS

WO 95 25292  9/1995  WIPO .

OTHER PUBLICATIONS

Patent Abstracts of Japan, vol. 096, No. 003, Mar. 29, 1996 and JP 07 302064 A, Canon Inc., Nov. 14, 1995 *abstract*.

*Primary Examiner*—William Dowling
*Attorney, Agent, or Firm*—Harness, Dickey & Pierce, P.L.C.

[57] ABSTRACT

A projection system includes first and second light valve projectors which project a composite image onto a screen by overlapping the first and second images in an overlap region. Each projector includes a light source, a light valve for reflecting or transmitting image light, a condensing lens for directing light from the light source to the light valve, and a projection lens. An improved light valve projector includes a blending device, associated with the first and second light valve projectors and being located in the path of the light between the light valve and the projection lens, the light source and the condensing lens, or the projection lens and the screen. The blending device smoothes off-state and on-state illumination levels in the overlap region without reducing the contrast ratio of said light valve projector. The blending device includes physical devices such as filters, solid masks, and/or a combination thereof as a substitute for electronic blending. By physically blending off-state illumination levels, the present invention avoids loss of contrast ratio associated with electronic blending.

49 Claims, 8 Drawing Sheets

PROJECTED IMAGE BLENDING FOR MULTIPLE IMAGES

This is a continuation of U.S. patent application Ser. No. 08/593,561, filed Jan. 29, 1996, now abandoned.

BACKGROUND OF THE INVENTION

1. Technical Field

This invention relates to light valve projectors and, more particularly, to filters for blending off-state and on-state illumination levels for a projection system which employs multiple light valve projectors to form an overlapping, composite image.

2. Discussion

Conventional projection systems have employed two (or more) light valve projectors to form a composite image. In the case of two projector systems, the images are positioned side-by-side or one on top of the other. Projector systems can also include an array of projectors. When two light valve projectors are used, one light valve projector projects a first portion of an image. A second light valve projector projects a second portion of the image. The first and second light valve projectors are positioned such that the first and second images are projected onto the screen adjacent to each other. As can be appreciated, it is difficult to align the two (or more) light valve projectors exactly and therefore undesirable seams between the first and second images are often apparent to the viewer.

To improve the appearance and continuity of the composite image, the first and second light valve projectors are conventionally positioned such that the first image slightly overlaps the second image to a form a seamless composite image. When the projectors are partially overlapped, the overlap region contains the illumination level for both projectors. The overlap region has a greater image intensity because the brightness levels are added together. To alleviate this problem, conventional light valve projection systems employ brightness adjustment electronics to eliminate the excessive brightness in the overlap region. For example, see U.S. Pat. Nos. 4,974,073 and 5,136,390 which discloses an electronic smoothing device for providing seamless composite images from multiple light valve projectors.

These electronic smoothing devices, however, cannot correct overlap errors at off-state levels without significantly reducing contrast. The off-state (or black level) of a light valve projector still contains some illumination or brightness as opposed to CRT projection systems where the brightness of the phosphor can be turned off completely. When two light valve projectors are partially overlapped to create a seamless composite image, the overlap region contains the off-state illumination level of both projectors. The illuminated areas from the first and second light valve projectors add together and a bright stripe is produced in the overlap region.

The black or off-state illumination level is the lowest light level that can be achieved by a light valve projector. Therefore, it is not possible to lower this off-state level further by electronic signal correction according to the above-identified patents. The only other solution which can be accomplished using electronic signal correction is to raise the black level of the non-overlapping regions to a level equal to the illumination level in the overlapping region. This electronic correction is not desirable since it significantly reduces the overall contrast ratio of the light valve projection system and cannot be used for applications such as night simulation where high contrast is required (in other words, maximum dark black levels).

Therefore, a method and apparatus for blending off-state illumination levels of a light valve projection system with multiple light valves to form seamless, composite images having maximum contrast is desirable.

SUMMARY OF THE INVENTION

A projection system includes first and second light valve projectors which project a composite image onto a screen by overlapping the first and second images in an overlap region. Each projector includes a light source, a light valve for reflecting or transmitting image light, a condensing lens for directing light from said light source to said light valve, and a projection lens. An improved light valve projector according to the present invention comprises blending means, associated with said first and second light valve projectors and being located in the path of said light between said light valve and said projection lens, said light source and said condensing lens, or said projection lens and said screen. The blending means smoothes off-state and on-state illumination levels in said overlap region without reducing the contrast ratio of said light valve projector.

According to one feature of the invention, the blending means is located in a focus position at or adjacent an image plane which said condensing lens focuses onto said light valve.

According to another feature of the invention, the blending means is located in a position at or adjacent an image plane which said projection lens focuses onto said screen.

According to another feature of the invention, the blending means is located between the projection lens and the screen.

According to other features of the invention, the blending means includes graded density filters, solid masks, density filters and/or combination thereof.

Other, objects, features and advantages will be readily apparent from the specification, the drawings and claims.

BRIEF DESCRIPTION OF THE DRAWINGS

The various advantages of the present invention will become apparent to those skilled in the art after studying the following specification and by reference to the drawings in which.

DETAILED DESCRIPTION OF THE INVENTION

Figures 1A, 1B:
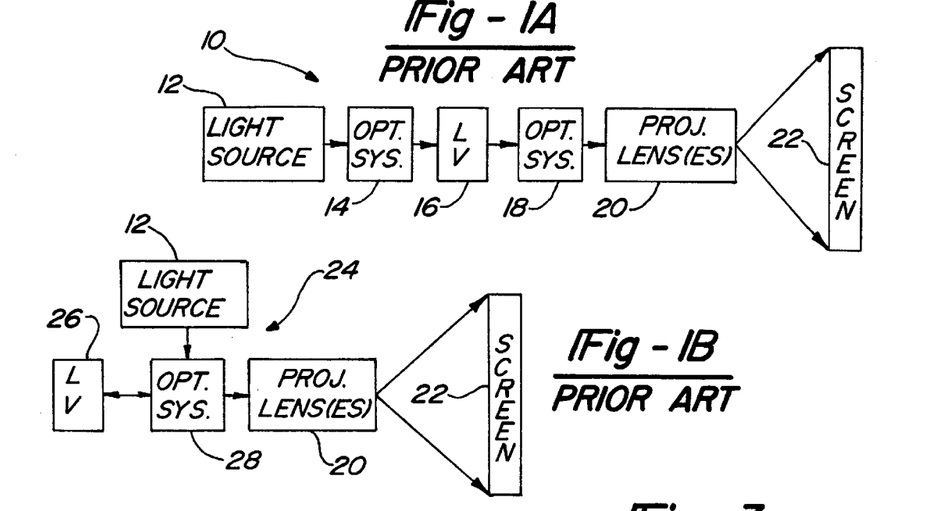
FIG. 1A is a functional block diagram of a transmissive light valve projection system according to the prior art.
FIG. 1B is a functional block diagram of a reflective light valve projection system according to the prior art.

The present invention is useful in a wide variety of light valve projectors including both transmissive and reflective-type light valve projectors which are illustrated in FIGS. 1A and 1B. In FIG. 1A, a transmissive light valve projector 10 according to the prior art is illustrated and includes a light source 12, one or more optical systems 14 and 18, one or more light valves 16, one or more projection lenses 20 and a screen 22. In FIG. 1B, a reflective light valve projector 24 is illustrated and includes a light source 12, one or more light valves 26, an optical system 28, one or more projection lenses 20 and screen 22. Projectors 10 and 24 can be monochrome or full color. Light source 12 is preferably a xenon arc lamp. As is well known in the art, such projector systems can use beam splitters and dichroic filters in the optical systems to create three channel full color images. Different light valve systems can also use either polarized light (birefringent light valve) or light mechanically directed from a beam, in other words, scattering, Schliern or dark field light. Light source 12 provides a reading light which is directed by the optical system onto one surface of light valve 26 or through light valve 16. Projection lens 20 outputs the modulated light onto screen 22.

The light valves employed can be photoactivated, birefringent liquid crystal reflective mode, matrix addressed birefringent liquid crystal diode (LCD), scattering mode LCD, tilted pixel mirror light valves, etc. Other suitable types of light valves will be apparent to skilled artisans.

Figure 2:
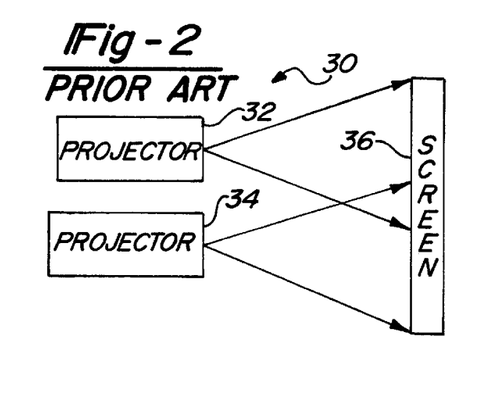
FIG. 2 is a top view of a prior art projection system employing multiple light valve projectors for providing an overlapping, composite image.

In FIG. 2, a projection system 30 with first and second light valve projectors 32 and 34 is illustrated. First light valve projector 32 projects a first image onto screen 36. Second light valve projector 34 projects a second image onto screen 36. First and second projectors 32 and 34 are arranged such that the first and second images partially overlap.

Figure 3:
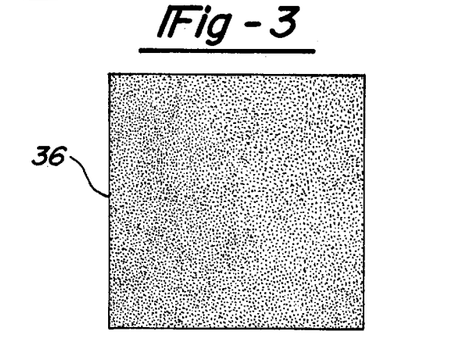
FIG. 3 illustrates an ideal off-state illumination level.
Figure 4:
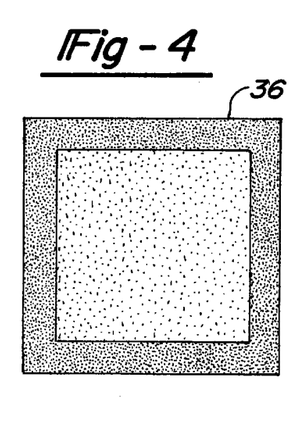
FIG. 4 illustrates the actual non-zero brightness, off-state or black level of a light valve projector.

FIG. 3 illustrates an idealized off-state or black level of a single projector. The ideal off-state includes no illumination or brightness. If the screen 36 is located in an ideal dark viewing room, the edge of a projector image is not detectable when the dark state is projected. Unfortunately, when light valve projectors are employed, the dark level is less than ideal and some illumination occurs. FIG. 4 illustrates a non-zero off-state of a typical light valve projector. As can be appreciated, the off-state illumination is visible.

Figure 5:
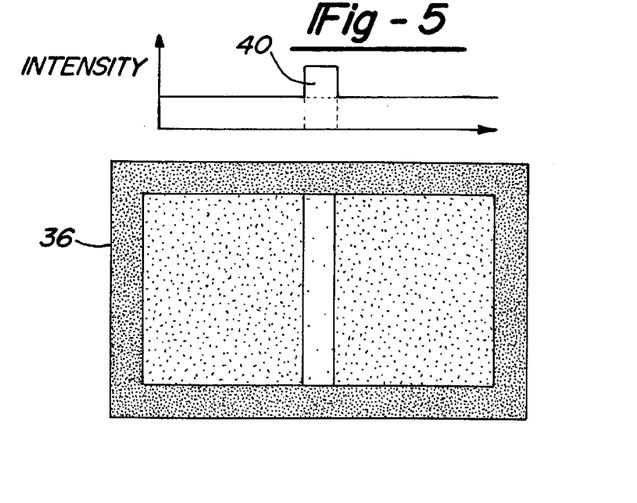
FIG. 5 illustrates an overlapping, composite image produced by two prior art projectors of FIG. 2 in the off-state.

The outer edges of the projected image can be seen against the ideally dark remainder of screen 36. When two light valve projectors are positioned in an overlapping manner, as illustrated in FIG. 2, the non-zero illumination or brightness of each of the two projectors is added together in the overlap region. As can be seen in FIG. 5, a bright stripe 40 is formed. Because the off-state brightness is a minimum, the previously described brightness adjustment electronics cannot eliminate the bright stripe without adversely affecting the contrast ratio of the light valve projection system. The visible bright stripe also reduces the image quality of the composite image.

The present invention will be illustrated below in conjunction with reflective-type light valves. Skilled artisans, however, will appreciate that the present invention has broader application and can be employed with both transmissive and reflective-type light valves.

Figure 6:
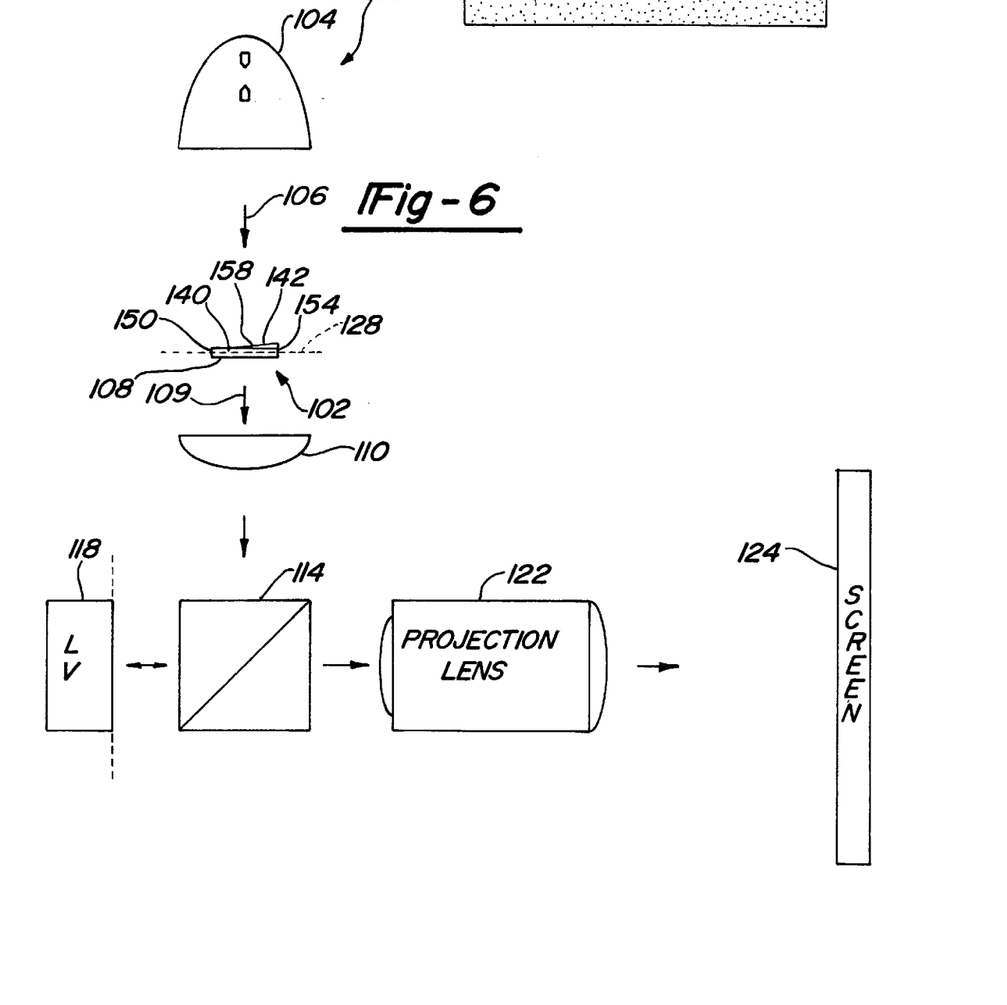
FIG. 6 illustrates a preferred embodiment of a first reflective light valve projector according to the invention and including a graded density filter located in a light valve focus position between an arc lamp and a condensing lens.

Referring to FIG. 6, a first light valve projector 100 according to the present invention is illustrated and includes a blending device 102 for blending illumination intensity in the overlap region. The relative position of the blending device 102 depends upon which edge of the image projected by the projector 100 needs blending. Skilled artisans can appreciate that multiple edges of the same projector may require blending, particularly where projector arrays are employed.

In a preferred embodiment, projector 100 includes a light source, such as an arc lamp 104, which produces a beam of light 106. Arc lamp 104 directs the beam of light 106 through blending device 102 which is preferably a graded density filter 108. Preferably graded density filter 108 is a graded neutral density filter. Light 109 exiting filter 108 is incident upon condensing lens 110. Light from the condensing lens 110 is incident upon a polarization beam splitter 114 which reflects light having a first polarization state onto one surface of a reflective light valve 118 and transmits light having a second polarization state. A CRT writes the back surface of light valve 118 and modulates light valve 118 in a conventional manner. Portions of the light valve 118 which are written by the CRT rotate the polarization of incident light and reflect the light towards polarization beam splitter 114. Portions which are not written by the CRT reflect incident light without a change in polarization. Polarization beam splitter 114 transmits modulated light (of the second polarization) through projection lens 122 and onto screen 124.

Blending device 102 (preferably a graded density filter 108) is positioned in a first focus position which is on or near an image plane 128 that the condensing lens 110 focuses onto light valve 118. Since the light valve is also focussed on the projection screen, the graded density filter is also focussed on the projection screen. FIG. 6 illustrates the orientation of the graded density filter 108 for one of the two or more light valve projectors. As can be appreciated, the orientation of the graded density filter 108 for the second and additional light valve projectors depends upon the positions of the remaining projectors relative to the first projector and the particular edge or edges which require blending. If only two light valve projectors are employed, the graded density filter 108 would be rotated 180° about the light rays for the second projector.

Figure 7:
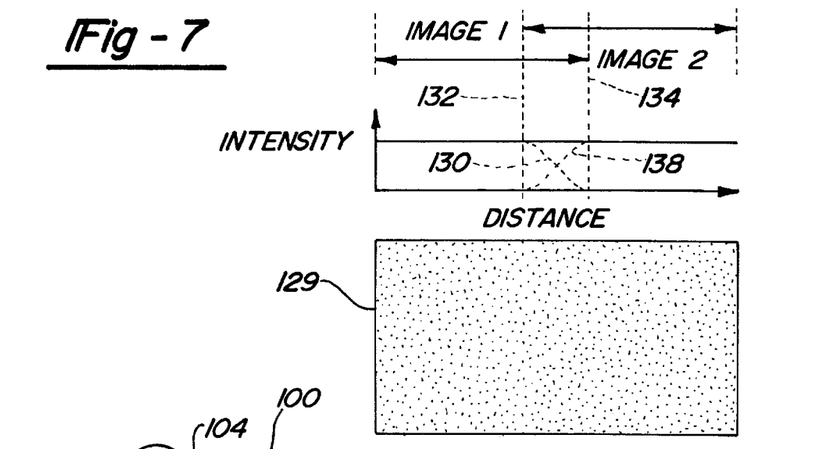
FIG. 7 is an intensity plot for two overlapping images projected by two light valve projectors illustrated in FIG. 6.

FIG. 7 illustrates an overlapping, composite image 129 along with an intensity graph showing the meshing of "Image 1" and "Image 2". Dotted lines 130 illustrate the attenuation in the overlapping region (which is defined by dotted lines 132 and 134) as a result of a first graded density filter 108. Dotted lines 138 illustrate the attenuation provided by a second graded density filter 108 (not shown) associated with a second projector (not shown). As can be appreciated, as the illumination level of "Image 1" decreases, the attenuation level of "Image 2" increases to provide a seamless, composite image.

Graded density filter 108 preferably includes a transparent substrate 140 having opposite edges 150 and 154. A graded density coating 142 is thinnest at a point 158 lying between opposite edges 150 and 154. The thickness of coating 142 increases from point 158 to edge 154. The graded density coating 142 can increase continuously or by graduated steps. Preferably the graded density coating 142 is a color neutral density coating.

Figures 8, 9:
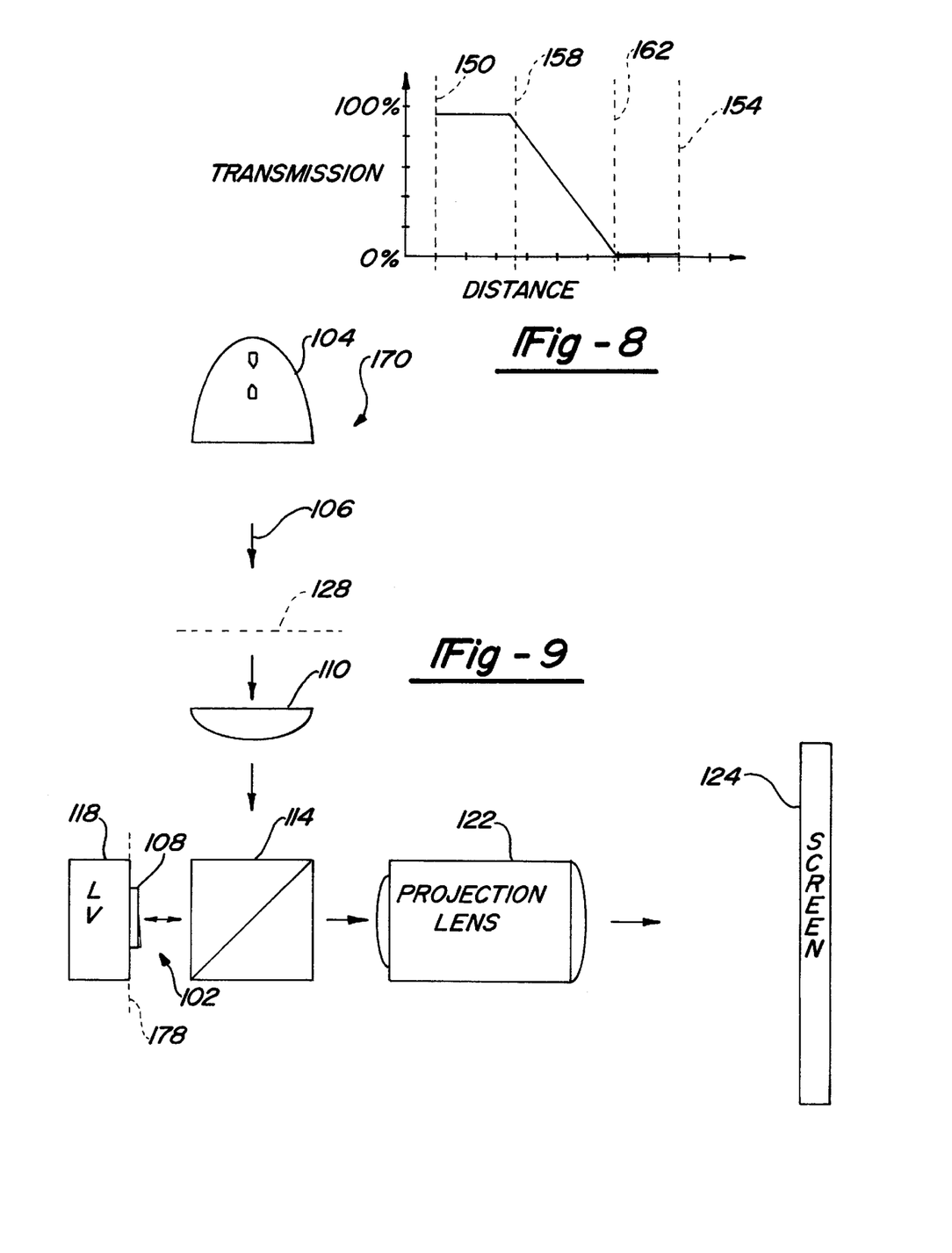
FIG. 8 is a transmission profile of the graded density filter of FIG. 6.
FIG. 9 illustrates a second light valve projector according to the invention and having a graded density filter located near a screen focus position between a light valve and a polarization beam splitter.

FIG. 8 illustrates a transmission profile of graded density filter 108. Areas outside of opposite edges 150 and 154 transmit 100% of light. Transmission is reduced somewhat by clear substrate 140 due to reflection in areas between edge 150 and point 158. As the thickness of graded density coating 142 increases, the amount of absorption or reflection of light increases and transmission decreases. Between point 158 and edge 154, coating 142 completely absorbs or reflects all incident light between dotted lines 162 and 154 in FIG. 8.

As can be appreciated from FIG. 6, light valve projectors 100, according to the present invention blend two or more images at the maximum black levels of the light valve projectors 100 and therefore do not decrease the contrast ratio thereof. Skilled artisans can appreciate that each color channel of full color light valve projectors will require blending devices. A fixture (not shown) positions blending device 102 relative to the light valve projector 100. The correct position of a blending device can be calculated from light ray diagrams. Preferably, however, the blending device 102 is positioned through simple trial and error.

Where multiple edges of the same projector require blending, multiple graded density coatings can be formed on additional edges of the transparent substrate 140.

A second light valve projector 170 according to the present invention is illustrated in FIG. 9. For purposes of clarity, reference numerals from FIG. 6 have been used where appropriate. Second light valve projector 170 operates in a manner similar to light valve projector 100. Blending device 102 (preferably graded neutral density filter 108) is positioned in a second focus position which is on or near an image plane 178 that projection lens 122 focuses onto screen 124. As can be appreciated, second light valve projector 170 also provides a seamless, composite image and has the performance and the transmission profile illustrated in FIGS. 7 and 8. Filter 108 can be tilted from orthogonal to the optical axis to avoid a reflection from its surface being transmitted to the projection screen. In a highly preferred embodiment, filter 108 is tilted 5–6° from an orthogonal plane in either x-axis or y-axis directions.

Figures 10, 11:
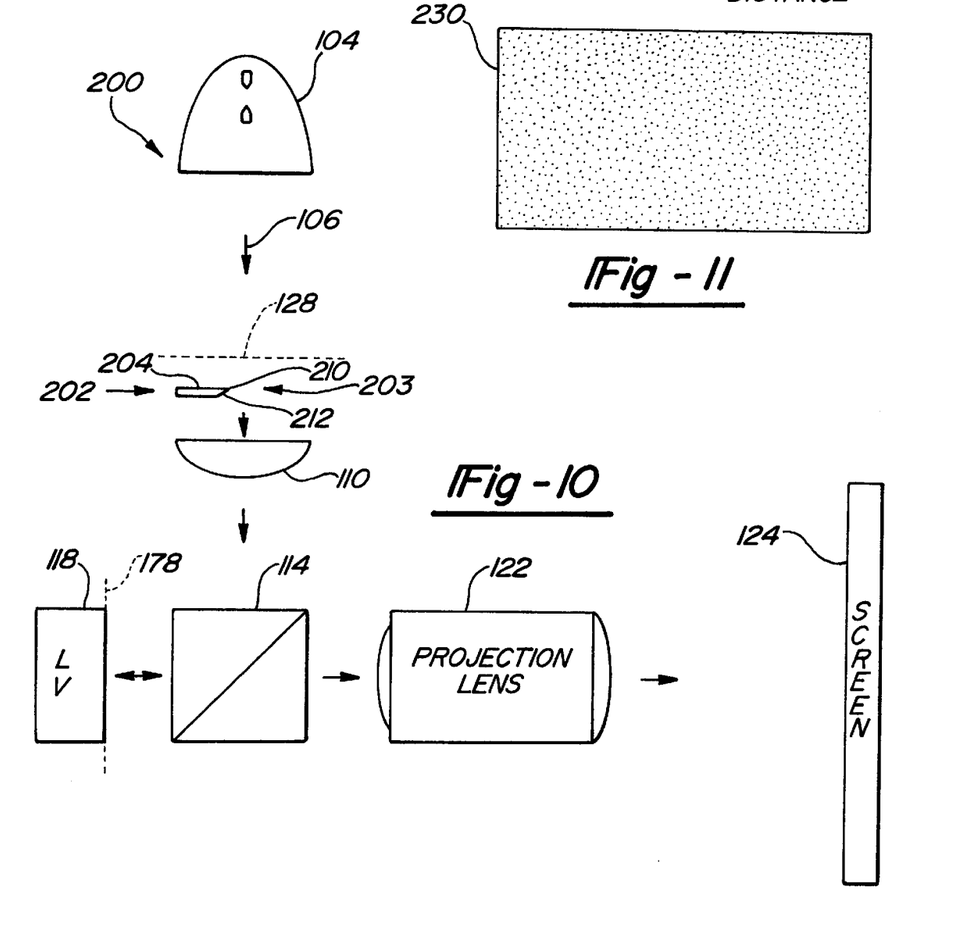
FIG. 10 illustrates a third light valve projector according to the invention and including a solid mask positioned in a non-focus position between an image plane and the condensing lens.
FIG. 11 is an intensity plot for two overlapping images projected by two light valve projectors illustrated in FIG. 10.

In FIG. 10, a third light valve projector 200 is illustrated. For purposes of clarity, reference numerals from FIG. 6 are used where appropriate. Third light valve projector 200 employs an alternate blending device 202 which includes a solid mask 204 having an edge portion 203. Solid mask 204 is positioned in a non-focus position between arc lamp 104 and condensing lens 110. More particularly, blending device 202 is located in a non-focus position between image plane 128 and condensing lens 110. Preferably solid mask 204 is made of metal.

FIG. 11 illustrates a seamless composite image 230 formed using two light valve projectors 200. As with the projectors in FIGS. 6 and 9, the position of second solid mask 204 will be rotated 180° about the light rays for the second projector. An inner edge 210 (adjacent edge portion 203) is preferably tapered along a back surface 212 thereof. Blending device 202 associated with a first light valve projector 200 attenuates the illumination of "Image" 1 in the overlap region (defined by dotted lines 220 and 222) as illustrated by dotted lines 224. The attenuation provided by a second blending device (rotated 180°) is a mirror image of the attenuation of the first blending device. If the projectors are precisely positioned so that the patterns match a relatively flat intensity output is generated at 228. The combined intensity of "Image 1" and "Image 2" is relatively constant across the seamless composite image 230 (including the overlapping region). The transitional intensities of "Image 1" and "Image 2" cancel each other. If the projectors are not precisely positioned a pattern of light and dark stripes will be produced as illustrated at 229 in FIG. 11.

Figure 12:
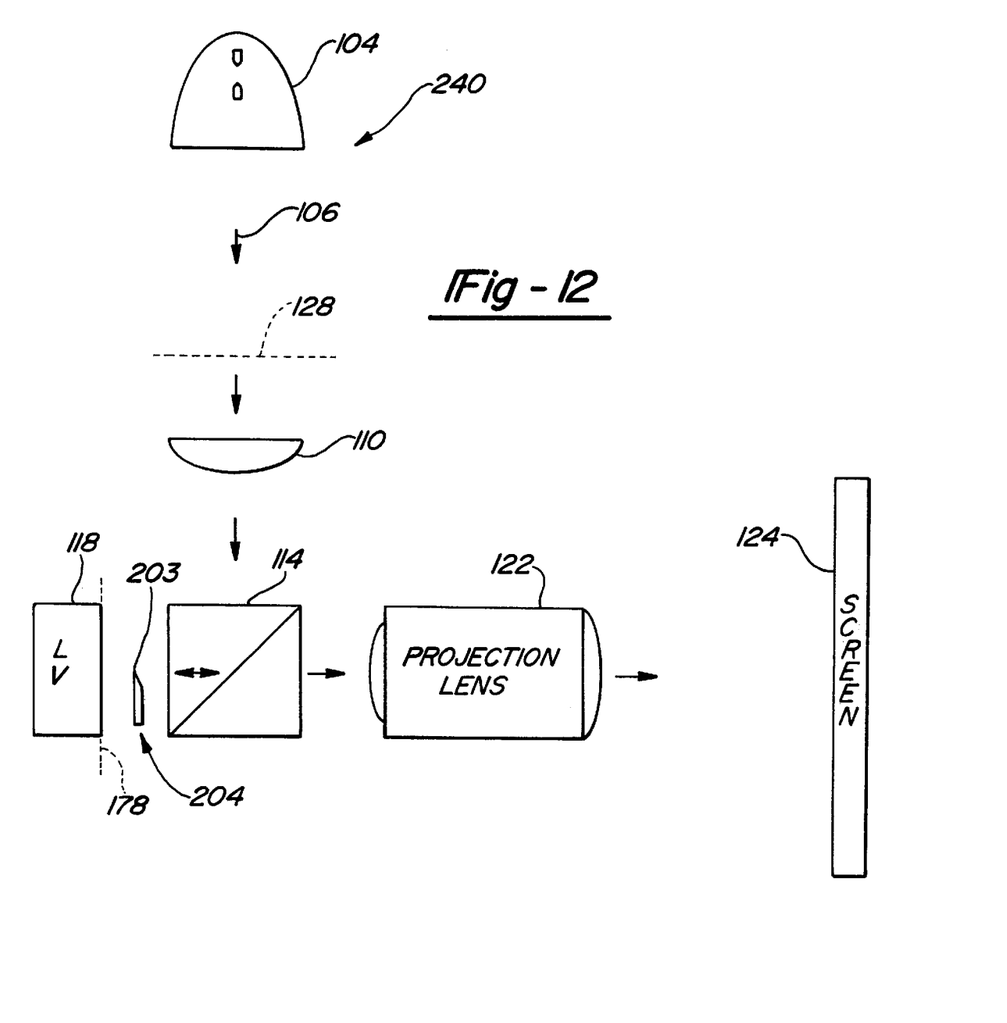
FIG. 12 illustrates a fourth light valve projector according to the invention with a solid mask positioned in a non-focus or screen position between the light valve and the polarization beam splitter.

FIG. 12 illustrates a fourth light valve projector 240 which provides blending according to the present invention. Blending device 203 is located in a second non-focus position between light valve 118 and polarization beam splitter 114. For purposes of clarity, reference numerals from FIG. 10 are used where appropriate. Light valve projector 240 has performance similar to that of light valve projector 200 (FIGS. 10 and 11). The width of the overlap region can be adjusted to obtain a smooth transition from "Image 1" to "Image 2" in the overlap region.

Figures 13, 14:
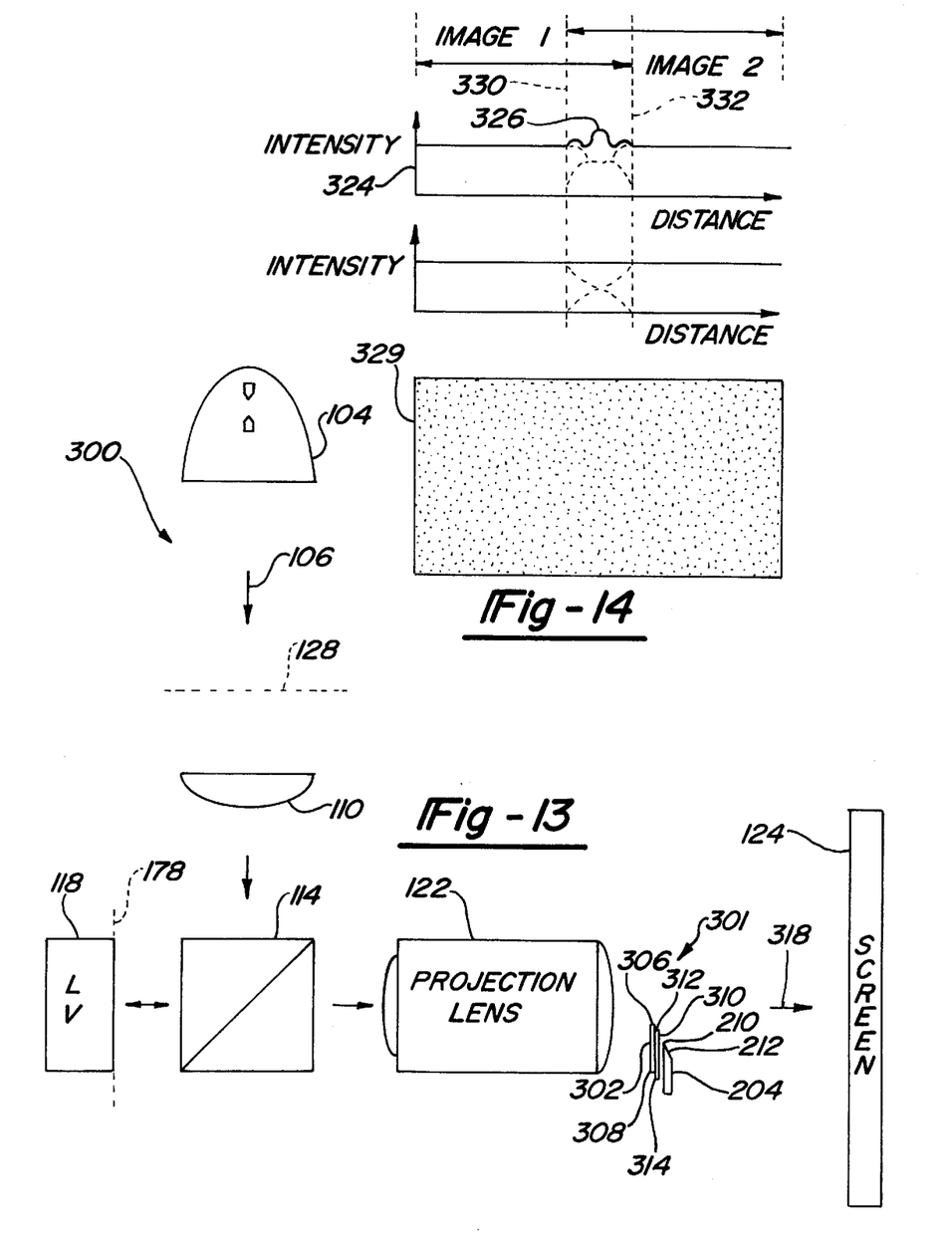
FIG. 13 illustrates a fifth light valve projector according to the invention and incorporating two offset, density filters and a solid mask located in a non-focus position between the projection lens and the screen.
FIG. 14 is an intensity plot of two overlapping images projected by two light valve projectors illustrated in FIG. 13.

In FIG. 13, a sixth light valve projector 300 is illustrated. For purposes of clarity, reference numerals from FIG. 12 have been employed where appropriate. A blending device 301 is positioned in a non-focus position between projection lens 122 and screen 124. Blending device 301 includes a first density filter 302 having opposite edges 306 and 308, a second density filter 310 having opposite edges 312 and 314, and a solid mask 204. Filters 302 and 310 and solid mask 204 have inner edges which are offset. More particularly, edge 306 of filter 302 extends into the path of light rays 318 (traveling from the projection lens 122 to screen 124) further than filter 310 or mask 204. Likewise edge 312 of filter 310 extends more inwardly into the path of rays 318 than edge 210 of mask 204. Filter 302 attenuates light rays traveling therethrough. The combined effect of filters 302 and 310 provides further attenuation. Preferably filters 302 and 310 are neutral density filters. Mask 204 provides maximum attenuation.

Referring to FIG. 14, intensity plots for the projector 300 of FIG. 13 are illustrated. Intensity plot 324 illustrates attenuation provided by the blending device 301 with solid mask 204 and without filters 302 and 310. As can be appreciated, a "bump" 326 occurs in the overlap region defined by dotted lines 330 and 332. Filters 302 and 310 attenuate the "bump" 326 in the overlap region. The provision of filters 302 and 310 in combination with solid mask 204 allows control of a wider overlap region than projectors employing a solid mask only. As can be appreciated, inner edges 306 and 312 of filters 302 and 310, respectively, are positioned in light rays reaching the overlap region.

Figure 15:
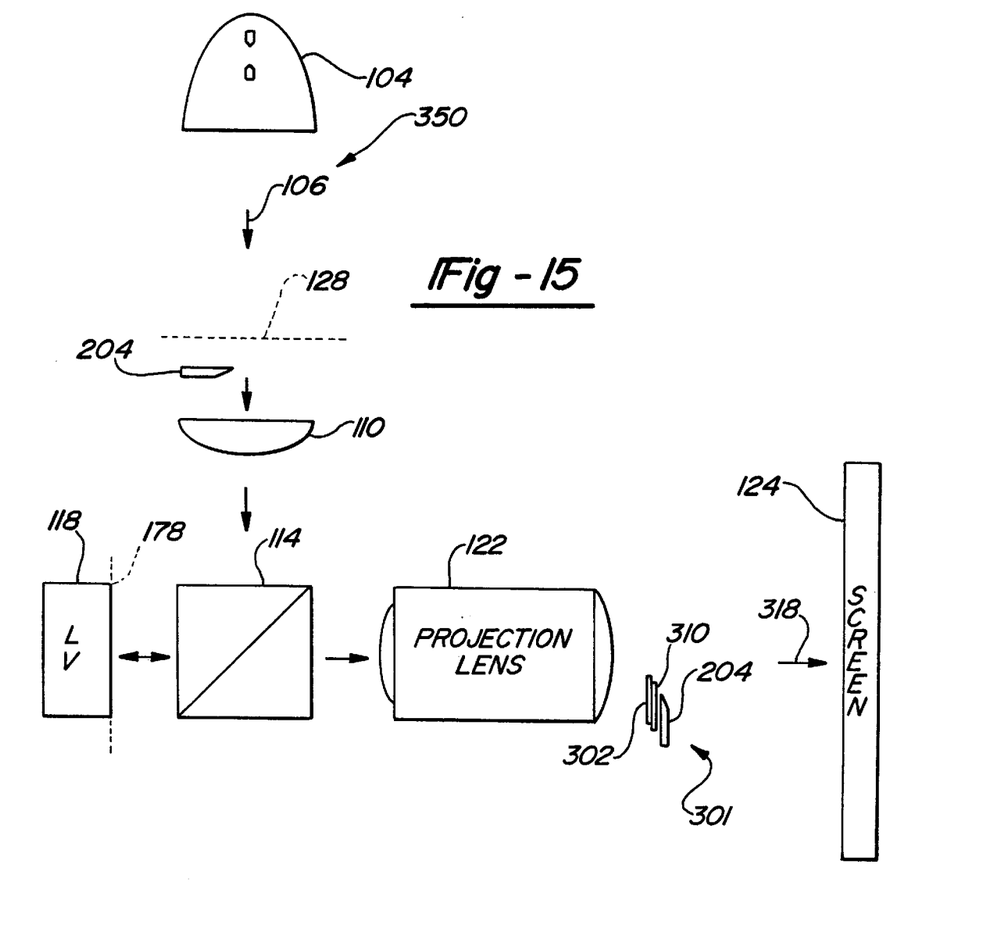
FIG. 15 illustrates a seventh light valve projector according to the invention which is similar to the projector shown in FIG. 13 and further includes a solid mask between the image plane and the condensing lens.

FIG. 15 illustrates a seventh light valve projector 350 according to the present invention. For purposes of clarity, reference numerals from FIG. 13 have been used where appropriate. In addition to the blending device 301 of projector 300 in FIG. 13, projector 350 of FIG. 15 also includes an additional solid mask 204 located in a non-focus position between image plane 128 and condensing lens 110. The performance of projector 350 is similar to that illustrated in FIG. 14. Additional fine tuning can be obtained through the use of solid mask 204.

Figures 16, 18:
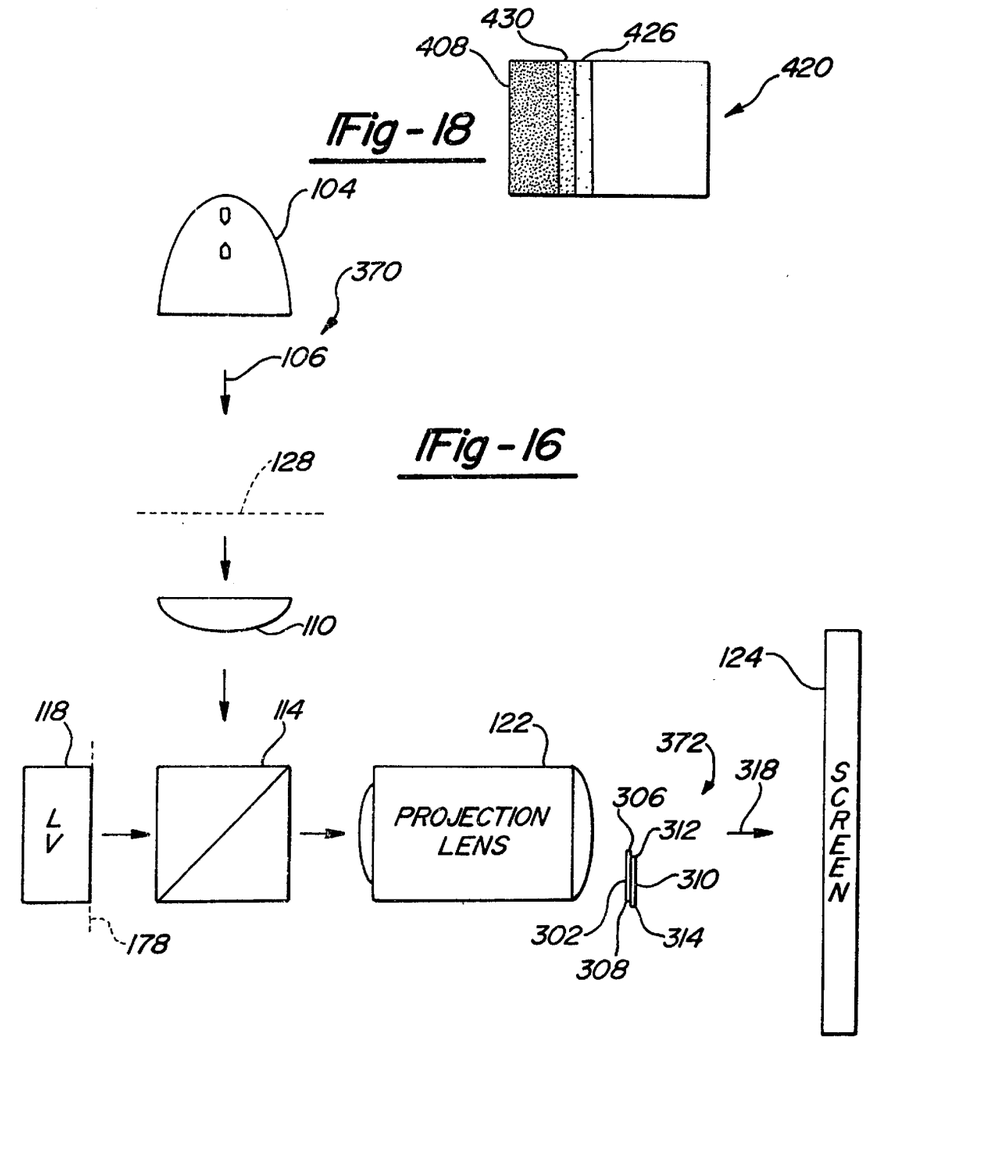
FIG. 16 illustrates an eighth light valve projector according to the invention and employing two offset density filters located between the projection lens and the screen.
FIG. 18 illustrates an alternate embodiment of the blending device of FIGS. 13 and 15 which includes density coatings and a metal film deposited on a glass substrate.

FIG. 16 illustrates an eighth light valve projector 370 according to the present invention. Reference numerals from FIG. 15 have been used were appropriate. Blending device 372 includes filters 302 and 310 but does not include a solid mask. A seamless, composite dark state image can be obtained.

Figure 17:
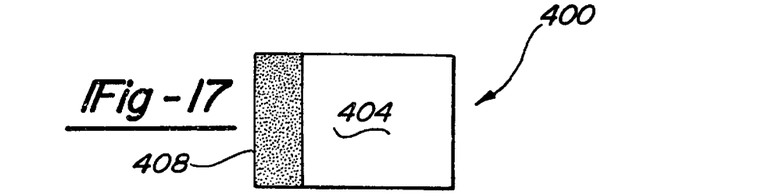
FIG. 17 illustrates an alternate embodiment of the solid mask which includes a glass substrate with a metal film deposited thereon.

FIG. 17 illustrates an alternate embodiment of solid mask 204. The alternative solid mask 400 can be fabricated by depositing a thin film 408 on a clear substrate 404. Preferably thin film 408 is opaque and is comprised of metal.

Blending device 301 illustrated in FIG. 15 can also be fabricated in a different manner. More specifically, alternate blending device 420 includes a clear substrate 422 having first and second density coatings 426 and 430 applied thereon in a step-like manner. Thereafter, a thin film 408 is deposited. As can be appreciated by skilled artisans, the clear substrates can be coated with anti-reflection coatings if desired. Preferably first and second density coatings are neutral density coatings.

Projectors made in accordance with the present invention smooth the illumination intensity in the overlap region when the projectors are operating in an off-state without reducing the contrast ratio of the projector. As a consequence they also correct the illumination intensity in the on-state areas of the blended images. Thus, electronic blending of the type described in U.S. Pat. Nos. 4,974,073 and 5,136,390 is not necessary or greatly reduced.

Various other advantages of the present invention will become apparent to those skilled in the art after having the benefit of studying the foregoing text and drawings, taken in conjunction with the following claims.

What is claimed:

1. In a projection system including first and second light valve projectors which project a composite image onto a screen by overlapping first and second images in an overlap region, each projector including a light source, a light valve for reflecting or transmitting image light, a condensing lens for directing light from said light source to said light valve, and a projection lens, an improved fight valve projector comprising:

blending means, associated with said first and second light valve projectors and being located in the path of said light between one of said light valve and said projection lens, said light source and said condensing lens, and said projection lens and said screen, said blending means for smoothing off-state and on-state illumination levels in said overlap region without reducing the contrast ratio of said light valve projector, said blending means comprising a mask having a tapered edge, said mask being located in the path of said light.

2. The improved light valve projector of claim 1 wherein said light valve is a reflective light valve and said projection system further includes a polarization beam splitter.

3. The improved light valve projector of claim 1 wherein said blending means is located in a focus position at or adjacent an image plane which said condensing lens focuses onto said light valve.

4. The improved light valve projector of claim 3 wherein said blending means comprises:

a clear substrate; and a coating formed thereon.

5. The improved light valve projector of claim 4 wherein said coating is a neutral density coating.

6. The improved light valve projector of claim 5 wherein the thickness of said neutral density coating increases from a point between opposing edges to at least one of the said opposing edges.

7. The improved light valve projector of claim 6 wherein the thickness of said neutral density coating increases continuously.

8. The improved light valve projector of claim 6 wherein the thickness of said neutral density coating increases in steps.

9. The improved light valve projector of claim 1 wherein said light valve is a reflective liquid crystal light valve.

10. The improved light valve projector of claim 1 wherein said blending means is located in a position at or adjacent an image plane which said projection lens focuses onto said screen.

11. The improved light valve projector of claim 10 wherein said blending means comprises:

a clear substrate; and a coating formed thereon.

12. The improved light valve projector of claim 11 wherein said coating is a neutral density coating.

13. The improved light valve projector of claim 10 wherein said blending means is located adjacent said light valve.

14. The improved light valve projector of claim 1 wherein said blending means is located in a non-focus position between said light valve and said projection lens.

15. The improved light valve projector of claim 1 wherein said blending means comprises a mask located in a non-focus position between said condensing lens and an image plane which said condensing lens focuses onto said light valve.

16. The improved light valve projector of claim 15 wherein said mask has a tapered edge located in the path of said light.

17. The improved light valve projector of claim 14 wherein said mask comprises a glass substrate having a thin film coating formed on a surface thereof.

18. The improved light valve projector of claim 1 wherein said blending means is located in a non-focus position between said projection lens and said screen.

19. The improved light valve projector of claim 18 wherein said blending means comprises:

a first neutral density filter; and a second neutral density filter located adjacent said first neutral density filter.

20. The improved light valve projector of claim 19 wherein said blending means further comprises a mask located adjacent said second neutral density filter and having a tapered edge located in the path of said light.

21. The improved light valve projector of claim 20 wherein said mask includes a tapered edge.

22. The improved light valve projector of claim 20 wherein said first and second neutral density filters and said mask are situated adjacent to each other.

23. The improved light valve projector of claim 20 wherein inner edges of said first and second neutral density filters and said mask are positioned in the path of said light.

24. The improved light valve projector of claim 23 wherein said blending means further comprises a second mask located in a non-focus position between said condensing lens and an image plane which said condensing lens focuses onto said light valve.

25. The improved light valve projector of claim 24 wherein said second mask has a taped edge located in the path of said light.

26. A projection system, comprising:
an image projector that projects a composite image formed from a plurality of overlapping images;
a projection screen positioned in an image plane that displays the projected composite image;
a plurality of light blending devices each positioned between the image projector and the screen such that one image of the plurality of projected images is incident thereon, and each having a body with a substantially continuous outer periphery, an input surface that receives the image, and an exit surface that passes the image, the body having at least a portion thereof that varies in thickness between the input and exit surfaces to adjust an illumination level in a region of the image that overlaps with a region of one or more images in the plurality of images such that the composite image displayed on the projection screen is seamless;
a first filter including a body with input and exit surfaces, and first and second opposing edges, the exit surface of the filter being positioned adjacent the input surface of one of the light blending devices such that the first edge is offset from the periphery of the light blending device to attenuate light passing therethrough; and
a second filter including a body with input and exit surfaces, and first and second opposing edges, the exit surface of the filter being positioned adjacent the input surface of the first filter such that the first opposing edge of the second filter is offset from the first opposing edge of the first filter to attenuate light passing therethrough.

27. The projection system according to claim 26 wherein the first and second filters are neutral density filters.

28. The projection system according to claim 26 wherein the light blending devices are graded density filters, each comprising a transparent substrate and a color-neutral density coating of varying thickness disposed thereon.

29. The projection system according to claim 26 wherein the light blending devices are solid metal masks.

30. The projection system according to claim 26 wherein at least one of the light blending devices is formed of a first and a second filter, each including a body, input and exit surfaces, and first and second opposing edges, with the second filter exit surface being positioned adjacent the input surface of the first filter such that the first opposing edge of the second filter is offset from the first opposing edge of the first filter to attenuate light passing therethrough.

31. The projection system according to claim 30 wherein the first and second filters are neutral density filters.

32. The projection system according to claim 26, wherein the portion of the body that varies in thickness in each of the plurality of light blending devices smooths off-state and on-state illumination levels in a region of the image that overlaps with one or more of the other images.

33. The projection system according to claim 26, wherein each of the plurality of light blending devices is tillable relative to the image plane to minimize reflection from the device transmitted to the projection screen.

34. The projection system according to claim 26, wherein the image projector comprises a plurality of light valve projectors, each of the plurality of light valve projectors comprising:
a light source that generates source light;
a lens that focuses the source light;
a light valve that modulates the source light focused by the lens with image data supplied to the image projector; and
a projection lens that projects the source light modulated by the light valve onto the projection screen.

35. The projection system according to claim 34 wherein each of the light blending devices is positionable in a focus position between the light source and the lens.

36. The projection system according to claim 34 wherein each of the light blending devices is positionable in a non-focus position between the light source and the lens.

37. The projection system according to claim 34 wherein each of the light blending devices is positionable in a focus position between the light valve and the projection lens.

38. The projection system according to claim 34 wherein each of the light blending devices is positionable in a non-focus position between the light valve and the projection lens.

39. The projection system according to claim 34 wherein each of the light blending devices is positionable in a non-focus position between the projection lens and the projection screen.

40. The projection system according to claim 26 wherein each of the light blending devices increases in thickness from a central portion of the body to the outer periphery.

41. The projection system according to claim 26 wherein each of the light blending devices decreases in thickness from a central portion of the body to the outer periphery.

42. A blending device for a projector in a composite image projection system, comprising:
a body including a substantially continuous periphery;
an input surface defined on the body that receives light generated by the projection system;
an exit surface defined on the body opposite the input surface;
the body including at least a portion thereof that varies in thickness between the input and exit surfaces to attenuate the light generated by the projection system such that when the light is combined with light from other system projectors, a seamless composite image is formed;
a first filter having a body, input and exit surfaces, and first and second opposing edges, with the first filter exit surface being positioned adjacent the input surface such that the first edge is offset from the substantially continuous periphery to attenuate light passing therethrough; and
a second filter having a body, input and exit surfaces, and first and second opposing edges, with the second filter exit surface being positioned adjacent the input surface of the first filter such that the first opposing edge of the second filter is offset from the first opposing edge of the first filter to attenuate light passing therethrough.

43. The blending device according to claim 42, wherein the blending device is a clear substrate with a color-neutral, variable-thickness density coating.

44. The blending device according to claim 42, wherein the blending device is a solid metal mask.

45. The blending device according to claim 42, wherein the first and second filters are neutral density filters.

46. The blending device according to claim 42, wherein the blending device is formed of a first and second filter, each having a body, input and exit surfaces, and first and second opposing edges, with the second filter exit surface being positioned adjacent the input surface of the first filter such that the first opposing edge of the second filter is offset from the first opposing edge of the first filter to attenuate light passing therethrough.

47. The blending device according to claim 46, wherein the first and second filters are neutral density filters.

48. The blending device according to claim 42, wherein the thickness between the input and exit surfaces increases from a central portion of the body to the periphery of the blending device.

49. The blending device according to claim 42 wherein the thickness between the input and exit surfaces decreases from a central portion of the body to the periphery of the blending device.

* * * * *